(12) United States Patent
Vampola et al.

(10) Patent No.: US 8,084,730 B2
(45) Date of Patent: Dec. 27, 2011

(54) DUAL MODE SOURCE FOLLOWER FOR LOW AND HIGH SENSITIVITY APPLICATIONS

(75) Inventors: John L. Vampola, Santa Barbara, CA (US); Bryan W. Kean, Colorado Springs, CO (US)

(73) Assignee: Raytheon Company, Waltham, MA (US)

( * ) Notice: Subject to any disclaimer, the term of this patent is extended or adjusted under 35 U.S.C. 154(b) by 495 days.

(21) Appl. No.: 12/332,132

(22) Filed: Dec. 10, 2008

(65) Prior Publication Data

US 2010/0140452 A1 Jun. 10, 2010

(51) Int. Cl.
*G01J 1/44* (2006.01)
(52) U.S. Cl. .................. 250/214 R; 250/208.1; 348/299; 348/314; 257/431
(58) Field of Classification Search ............... 250/208.1, 250/214.1, 214 R; 348/297, 299, 314; 257/431
See application file for complete search history.

(56) References Cited

U.S. PATENT DOCUMENTS

| | | | |
|---|---|---|---|
| 4,210,923 A | 7/1980 | North et al. ...................... 357/30 |
| 4,532,537 A | 7/1985 | Kane ............................... 357/30 |
| 5,461,428 A | 10/1995 | Yoo ................................ 348/558 |
| 5,539,206 A | 7/1996 | Schimert .................... 250/338.4 |
| 5,628,210 A | 5/1997 | Mista et al. ..................... 66/203 |
| 5,708,263 A | 1/1998 | Wong ......................... 250/208.1 |
| 5,841,126 A | 11/1998 | Fossum et al. ............. 250/208.1 |
| 2006/0164530 A1* | 7/2006 | Frey, Jr. ......................... 348/308 |

* cited by examiner

*Primary Examiner* — Francis M Legasse, Jr.
(74) *Attorney, Agent, or Firm* — Baker Botts L.L.P.

(57) ABSTRACT

In certain embodiments, a unit cell is provided. The unit cell may include a high sensitivity path and a low sensitivity path. The high sensitivity path may include a first transistor and a first switch. The first switch may couple an output node to the first transistor. The low sensitivity path may include a capacitor. A second switch may couple the high sensitivity path to the low sensitivity path. A third switch may couple the high sensitivity path and the low sensitivity path to a voltage node.

15 Claims, 3 Drawing Sheets

DUAL MODE SOURCE FOLLOWER FOR LOW AND HIGH SENSITIVITY APPLICATIONS

TECHNICAL FIELD OF THE INVENTION

The present invention relates generally to image capture, and more particularly to dual mode source follower for low and high sensitivity applications.

BACKGROUND OF THE INVENTION

Previous image capture devices were optimized for either a bright ambient light scene or a low ambient light scene. Image sensors used in image capture devices generally generate charge in proportion to light intensity received at that location. Low ambient light scenes requires components with low noise and low capacitance in order to provide high sensitivity. However, a bright ambient light scene requires higher capacitance in order to store the generated charge. These competing capacitance requirements lead to image capture devices being optimized for either a bright ambient light scene or a low ambient light scene.

SUMMARY OF THE INVENTION

In accordance with the present invention, the disadvantages and problems associated with prior image detection devices have been substantially reduced or eliminated.

In certain embodiments, a unit cell is provided. The unit cell may include a high sensitivity path and a low sensitivity path. The high sensitivity path may include a first transistor and a first switch. The first switch may couple an output node to the first transistor. The low sensitivity path may include a capacitor. A second switch may couple the high sensitivity path to the low sensitivity path. A third switch may couple the high sensitivity path and the low sensitivity path to a voltage node.

In certain embodiments, a method for image capture is provided. The method includes receiving an electrical charge in proportion to a detected light intensity. A first portion of the electrical charge may be accumulated at a node associated with a high sensitivity path. The high sensitivity path may be coupled to a low sensitivity path when the first portion of the electrical charge saturates the node. A second portion of the electrical charge may be accumulated at a capacitor associated with a low sensitivity path.

Technical advantages of certain embodiments of the present invention include providing a unit cell that provides both high sensitivity and low sensitivity image capture within one device Other technical advantages of the present invention will be readily apparent to one skilled in the art from the following figures, descriptions, and claims. Additionally, while specific advantages have been enumerated above, various embodiments may include all, some, or none of the enumerated advantages. The following technical advantages may be achieved by some or all of the embodiments of the present invention.

BRIEF DESCRIPTION OF THE DRAWINGS

For a more complete understanding of the present invention and its advantages, reference is now made to the following descriptions, taken in conjunction with the accompanying drawings, in which.

DETAILED DESCRIPTION OF THE INVENTION

Figure 1:
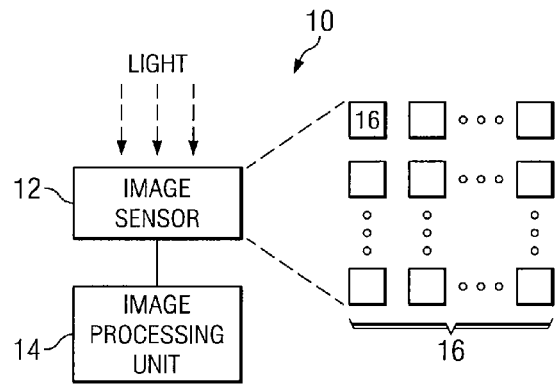
FIG. 1 is a block diagram illustrating an image capture device that may be used to capture images.

There are many types of image capturing devices such as digital cameras, video cameras, or other photographic and/or image capturing equipment. These image capturing devices may use image sensors, such as active pixel sensors (APS) or other suitable light sensing devices in order to capture the image. For example, a APS may be composed of an unit cell array that receives light from a lens. The light causes each unit cell to accumulate an electric charge proportional to the light intensity at that location.

Each unit cell in the array may be circuitry that may include a capacitor and other components. Each unit cell in the array generally corresponds to a picture element, or pixel, in the final image. A pixel is considered the smallest portion of a digital image. A digital image is generally made up of an array of pixels. Circuitry coupled to the image capturing device may perform post light capture processing steps to convert the accumulated charge into pixel information. This information may include the color, saturation, brightness, or other information that a digital image storage format may require. Digital images may be stored in formats such as .JPG, .GIF, .TIFF, or any other suitable format.

An image capture device may be optimized for high or low sensitivity. This generally corresponds to a low ambient light situation or a bright ambient light situation. In a low ambient light situation, such as shadows, pictures taken at night, indoors, or other situations where there is a relatively low amount of ambient light, an image capture device generally requires a higher sensitivity in order to be able to differentiate levels of the accumulated electric charge to generate a meaningful image after processing. For example, in a high sensitivity device, an additional 5 units of charge could result in a different level of brightness in the final image, whereas in a low sensitivity device, an additional 50 units of charge would result in a different level of brightness in the final image.

In high sensitivity devices, parasitic capacitance, the unwanted and generally unavoidable capacitance that exists between parts of a circuit should be minimized. Because small changes in the units of charge may correspond to different levels in the final image, accumulated charge that is used to charge these "capacitors" may lead to larger errors in the final image. The result is that amount of the accumulated charge may not proportionally reflect the light intensity at the location or result in an image that is higher in noise.

A bright ambient light situation, such as a sunny day, a well-lit room, or other situations where there is a relatively large amount of ambient light, presents a different problem. In a bright ambient light situation, a much larger amount of charge accumulates due to the greater intensity of the light captured by the image capture device. The larger amount of charge generally requires the addition of a capacitor to store the accumulated charge generated at the APS array. There is usually a much greater amount of charge accumulated compared to the charge lost to the parasitic capacitance of the components that the effect of the parasitic capacitance may generally be ignored. Thus, an image capture device that is optimized for a bright ambient light situation would not perform optimally in a low ambient light situation due to the difference in accumulated charge and capacitance requirements for the two situations.

FIG. 1 is a block diagram illustrating an image capture device 10 that may be used to capture images. For example device 10 may be a digital camera, video camera, or other photographic and/or image capturing equipment. Image capture device 10 comprises image sensor 12 and image processing unit 14. Image sensor 12 may be a APS or other suitable light sensing device that can capture images. Image processing unit 14 may be a combination of hardware, software, or firmware that is operable to receive signal information from image sensor 12 and convert the signal information into an electronic image.

Image sensor 12 may comprise of an array of unit cells 16. Unit cells 16 may accumulate charge proportional to the light intensity at that location. Each unit cell 16 may correspond to a pixel in the captured electronic image. Unit cell 16 may temporarily store the accumulated charge for use by processing unit 14 to create an image. The stored charge, for example, may be converted into a voltage and the value of the voltage may be sampled by processing unit 14 in order to digitize and store the value into some form of memory.

A particular method for image capture using image capture device 10 may be ripple capture. Ripple capture is a method that captures each row of pixels from image sensor 12 in order. For example, ripple capture may expose the top row of pixels of image sensor 12 to light, followed by the second row, followed by the third row, and so forth until the last row of pixels of image sensor 12 is exposed to light. A particular method for image processing unit 14 to receive pixel information captured by image sensor 12 may be ripple read. Ripple read is a method that processes each row of pixels from image sensor 12 in order. Similar to ripple capture, ripple read may process the top row of pixels of image sensor 12, followed by the second row, followed by the third row, and so forth until the last row of pixels of image sensor 12 is processed. A ripple reset operation to reset the rows of pixels of image sensor 12 may be performed similarly.

These methods may be performed on consecutive rows. For example, a ripple capture operation may begin with the first row of image sensor 12. As the ripple capture operation moves to the second row, a ripple read operation may begin on the first row of image sensor 12. After the ripple capture operation moves to the third row, the ripple read operation may begin on the second row and a ripple reset operation may begin on the first row. This may continue until the last row is processed. Once the last row is processed, the image may be processed and stored by processing unit 14.

Figure 2:
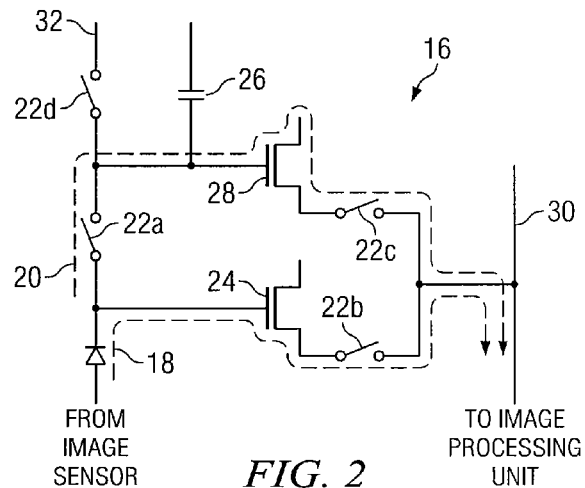
FIG. 2 illustrates a unit cell that may be coupled to an image sensor and image processing unit.

FIG. 2 illustrates a unit cell 16 that may be coupled to image sensor 12 and image processing unit 14. Unit cell 16 comprises two paths, a high sensitivity path 18 and a low sensitivity path 20. Unit cell 16 may also comprise switches 22 that are operable to couple or isolate components of high sensitivity path 18 and low sensitivity path 20 from each other. High sensitivity path 18 may comprise high sensitivity transistor 24. Low sensitivity path 20 may comprise capacitor 26 and low sensitivity transistor 28. Both high sensitivity path 18 and low sensitivity path 20 may be coupled to image processing unit 14 via output bus 30. High sensitivity path 18 and low sensitivity path may also be coupled to a voltage node 32 through switches 22.

High sensitivity path 18 may be used in low ambient light situations. In a low ambient light situation, the electric charge generated at image sensor 12 may be small due to the lower intensity of light. Thus, a smaller capacitance is required to store the generated charge. The inherent capacitance of the components coupled to high sensitivity path 18 may be sufficient to provide storage of the electric charge generated at image sensor 12. In general, to achieve high sensitivity, the parasitic capacitance of components in a high sensitivity should also be small. Parasitic capacitance may cause the storage of additional electric charge within the high sensitivity path 18 and thus cause a lower charge to signal voltage conversion to the intensity of the light received at image sensor 12. In a high sensitivity environment, small amounts of additional electric charge can lead to greater errors in the final output. For example, if the parasitic electric charge were 100 units and the intensity of the light generated 1,000 units of electric charge, a 10% error would have been introduced. Thus, in high sensitivity path 18, components coupled to high sensitivity path 18 such as high sensitivity transistor 24 and switch 22a may be chosen to have a small amount of parasitic capacitance.

A particular issue with the low capacitance of high sensitivity path 18 is that the circuit may become saturated. Saturation occurs when the generated charge exceeds the storage capability of the components. This may occur, for example, when capturing an image with low and bright ambient light. For example, the desired image could contain a shadowed region and a non-shadowed region. The greater amount of electric charge generated at image sensor 12 for the non-shadowed region may exceed the ability of the components in high sensitivity path 18 to store. Unit cell 16 provides a mechanism for handling this situation as described with respect to FIG. 5.

Low sensitivity path 20 may be used in bright ambient light situations. In a bright ambient light situation, the electric charge generated at image sensor 12 may be much greater due to the higher intensity of light. Thus, a greater capacitance is used to store the generated charge. The inherent capacitance of the components of high sensitivity path 18 may not be enough to store all the generated charge. The addition of capacitor 26 provides additional storage capacity for the greater amount of electric charge generated due to the greater intensity of light at image sensor 12.

Parasitic capacitance becomes less of a concern in a low sensitivity environment. For example, if the parasitic electric charge were 100 units and the intensity of light generated 10,000 units of electric charge, only a 1% error would have been introduced. Thus, in low sensitivity path 20, low sensitivity transistor 28 may be chosen to provide the capability to handle larger amounts of charge as opposed to having a small parasitic capacitance.

In certain embodiments, low sensitivity transistor 28 and switch 22c may be optional. The presence of low sensitivity transistor 28 and switch 22c may provide certain advantages such as the use of a transistor to handle the greater amount of charge stored by capacitor 26. Alternatively, if low sensitivity transistor 28 and switch 22c is not present, a read operation may be performed through high sensitivity path as described with respect to FIG. 8.

Switches 22 may be mechanical or transistor switches. A transistor switch may offer advantages over mechanical switches in lower costs of manufacture and in particular embodiments the ability for until cell 16 to handle a saturation situation. In a particular embodiment, switches 22 may comprise CMOS transistors. A transistor switch that is closed may also be referred to as being in the on position. Each of switches 22 may be a transistor having different properties. For example, switch 22a may be chosen to have a minimum gate size to facilitate saturation that is lower than the saturation for high sensitivity path 18. Switch 22d, on the other hand, may have a different gate size to facilitate saturation than switch 22*a* because connections to the voltage node 32 are not desired when accumulating charge.

Voltage node 32 provides a drain for the accumulated charge. Draining the accumulated charge provides a reset function. The reset function is described with respect to FIG. 9. As each image is captured and processed by image capture device 10, the accumulated charge must be removed from unit cell 16 in order to capture a new image. Otherwise the accumulated charge from the new image would be added to any previously accumulated charge leading to imaging errors.

Figure 5:
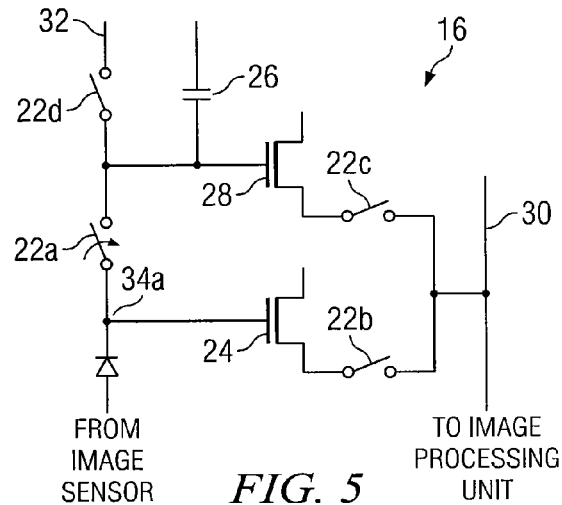
Figure 6:
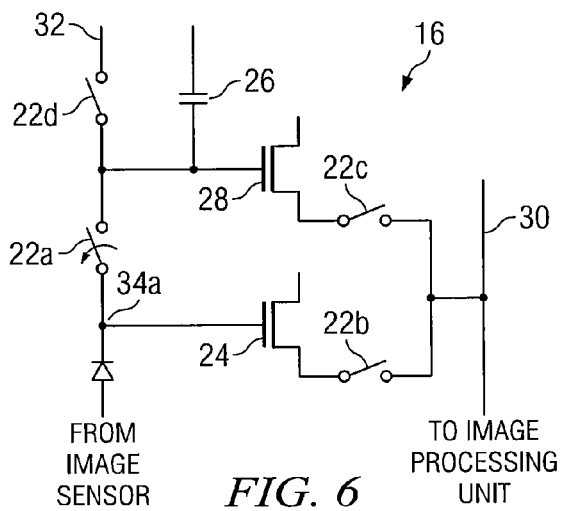
Figure 7:
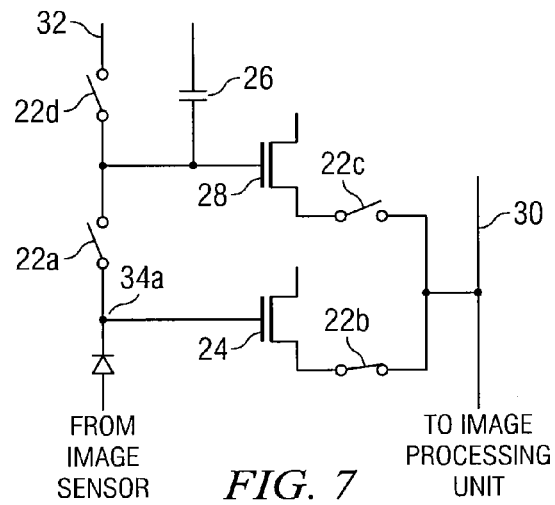
FIGS. 7-8 illustrate the configuration of switches in the unit cell for a read operation.
Figure 8:
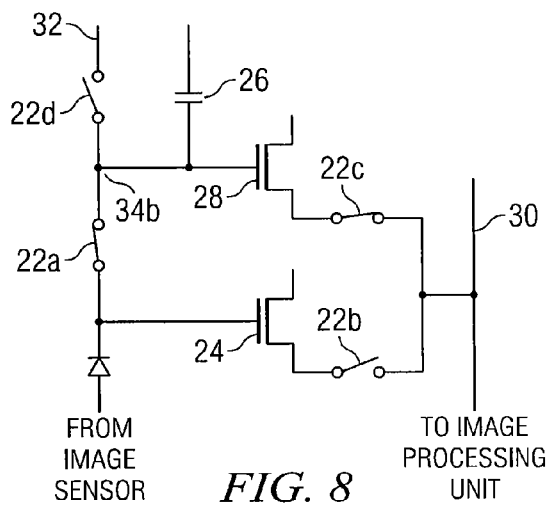
Figure 9:
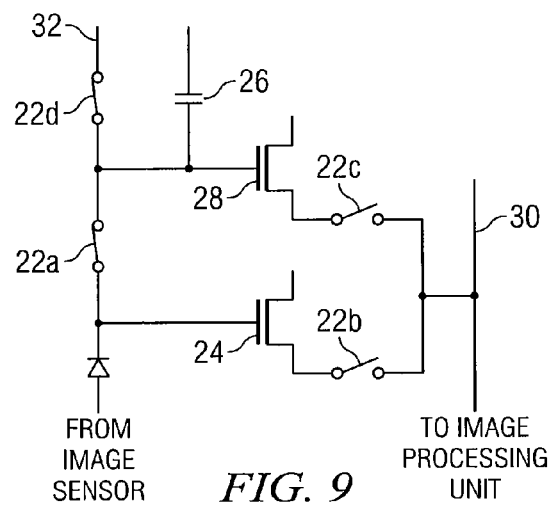
FIG. 9 illustrates the configuration of switches in the unit cell for a reset operation.

FIGS. 3-9 illustrate the operation of unit cell 16. FIGS. 3-6 illustrate the configuration of switches 22 for an image capture operation using unit cell 16. FIGS. 7 and 8 illustrate the configuration of switches 22 for a read operation using unit cell 16. FIG. 9 illustrates the configuration of switches 22 for a reset operation of unit cell 16.

FIGS. 3-6 illustrate the operation of unit cell 16 in capture mode. Capture mode is the process of capturing an image. For example, if image capture device 10 is a camera, capture mode could be initiated by pressing the shutter switch, exposing image sensor 12 to light.

Figure 3:
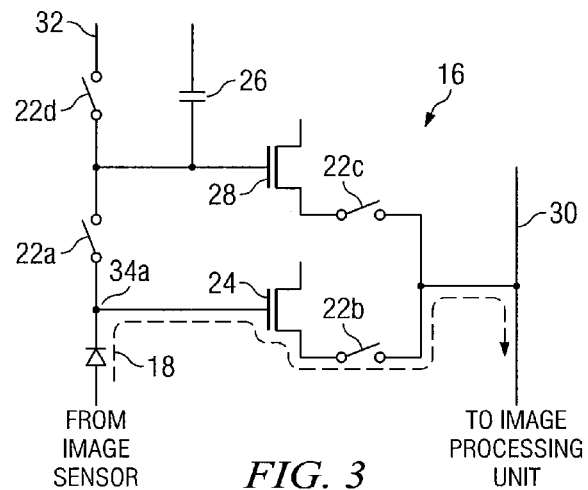
FIGS. 3-6 illustrate the configuration of switches in the unit cell for an image capture operation.

FIG. 3 illustrates the configuration of unit cell 16 in a high sensitivity capture mode. High sensitivity capture mode provides image capture in a low ambient light situations. This mode may be user selected. In high sensitivity capture mode, all switches 22 are in the open position. This isolates high sensitivity path 18 from the components in low sensitivity path 20. Charge is accumulated at node 34*a* for a predetermined period of time. In general, the accumulated charge will not be enough to saturate node 34*a*. If node 34*a* becomes saturated, unit cell 16 may operate as described in FIG. 5.

Figure 4:
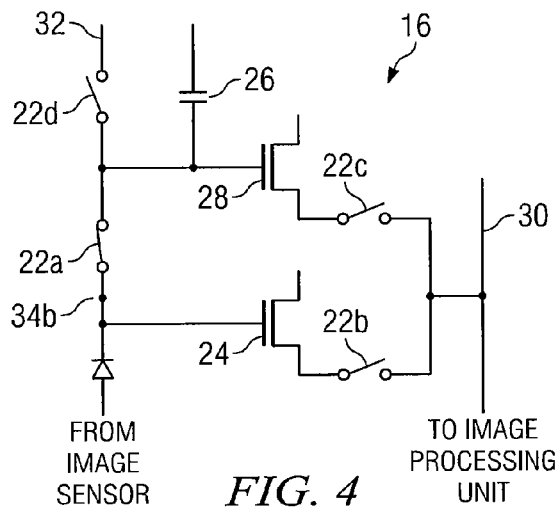

FIG. 4 illustrates the configuration of unit cell 16 in a low sensitivity capture mode. Low sensitivity capture mode provides image capture in a bright ambient light situation. This mode may be user selected. In low sensitivity capture mode, switch 22*a* is in the closed position while all other switches 22*b*, 22*c*, and 22*d* are in the open position. This couples capacitor 26 to node 34*b*. By coupling capacitor 26 to node 34*b*, charge generated at image sensor 12 may be stored at capacitor 26. Charge may be accumulated for a predetermined period of time.

FIG. 5 illustrates the configuration of unit cell 16 in a saturation mode. In saturation mode, enough charge accumulates at node 34*a* to exceed the capacitance of the components of high sensitivity path. This may normally lead to loss of pixel information. However, by closing switch 22*a*, additional capacitance becomes available to store additional charge. In certain embodiments switch 22*a* is a transistor. The transistor may be chosen so that the accumulated charge that causes the transistor to turn on at a certain accumulation threshold. Generally this threshold is slightly less than the total capacitance of node 34*a*. In this embodiment, switch 22*a* may automatically close when the accumulated charge is about to saturate node 34*a*. Turning the transistor on is equivalent to closing switch 22*a*. Closing switch 22*a* allows charge to be stored at node 34*a* and in capacitor 26. This allows unit cell 16 to store all the accumulated charge generated at image sensor 12 even if the accumulated charge would otherwise cause high sensitivity mode to be saturated.

A particular problem with high sensitivity is that if the accumulated charge exceeds the ability of the components to store, information regarding the pixel could be lost. By use of a switch that selectively couples capacitor 26 to node 34*a*, unit cell 16 may operate in high sensitivity mode without losing pixel information if there is a mixed scene. This may allow capture of details of the low ambient light areas of a scene without sacrificing pixel information in bright ambient light areas of the same scene.

Particular advantages of unit cell 16 includes the ability to provide both high and low sensitivity modes of operation in a single unit cell. This permits more optimal capture of scenes using a single image capture device. Additionally, the saturation mode of operation provides the ability to capture details in a mixed scene without sacrificing pixel information.

FIG. 6 illustrates the configuration of unit cell 16 in a snapshot capture mode. In snapshot capture mode, unit cell 16 may initially be operating in low sensitivity mode. Thus, switches 22 are configured as shown with respect to FIG. 4. For example, switch 22*a* is in the closed position while other switches 22 are in the open position. To initiate snapshot capture mode switch 22*a* is moved from the closed position to the open position as illustrated in FIG. 6. This prevents additional charge from accumulating at capacitor 26. Additional charge from image sensor 12 may be accumulated at node 34*a*. It is assumed that any additional charge accumulated at node 34*a* does not cause a saturation to occur. The charge may be stored until a read operation as described with respect to FIGS. 7-8 is performed.

In snapshot mode all pixels may be imaged at the same moment in time. Generally, an entire image is exposed at the same time while the shutter is open, for example, in flash photography. However, in practice, often the shutter actually opens from the top of the image and propagates downward. While the shutter propagates downward, a second shutter follows the first shutter leaving a moving exposure gap. This operation is analogous to the ripple capture operation described above. Thus, pixels at the top of an image may be recorded in a different relative position than pixels at the bottom of the image. In an embodiment, snapshot mode may be useful to capture the relative position of moving objects in a scene. In a ripple read, described above, pixels processed first have the most latency with respect to the pixels processed last in an image. If there were moving objects in a scene, for example, a plane in the sky and a car on the ground in an image, the objects might appear to be closer or farther apart due to the latency.

In another embodiment, by temporarily storing the image, image capture device 10 can be moved to a different location while pixel information is processed from image sensor 12 to image processing unit 14. In certain embodiments, rows of unit cell 16 in image sensor 12 may be constantly capturing images using the ripple capture, read, reset method described above. Moving the image capture device 10 or image sensor 12 before an entire image is processed by image processing unit 14 may cause parts of the image to smear.

FIGS. 7-8 illustrate the configuration of unit cell 16 in a read operation. It is assumed that a capture operation has occurred. A read operation creates a signal for image processing unit 14 to generate a pixel based on the accumulated charge on unit cell 16. For example, in a camera, the accumulated charge may represent the brightness of a particular pixel. In this example, the read operation is able to convey information regarding the amount of accumulated charge to image processing unit 14. This may be handled by image processing unit 14 by circuitry or other appropriate devices to convert the amount of charge into a voltage. Other suitable means may be employed.

FIG. 7 illustrates the configuration of unit cell 16 in a high sensitivity read operation. A read is performed through high sensitivity path 18. In the capture operation described above with regard to FIG. 3, charge has previously accumulated at node 34*a*. Switch 22*b* is closed providing a path from node 34a to output bus 30. The accumulated charge at node 34a may cause voltage to be generated at high sensitivity transistor 24 and through output bus 30. This voltage may represent the amount of accumulated charge at unit cell 16. Post processing unit 14 may then perform calculations to determine pixel information.

FIG. 8 illustrates the configuration of unit cell 16 in a low sensitivity read operation. A read may be performed through low sensitivity path 20. In the capture operation described above with requests to FIG. 4, charge has previously accumulated at capacitor 26. Switch 22c is closed providing a path to output bus 30. The accumulated charge stored at capacitor 26 may cause voltage to be generated at low sensitivity transistor 28 and through output bus 30. This voltage may represent the amount of accumulated charge at unit cell 16. Post processing unit 14 may then perform calculations to determine pixel information.

In certain embodiments, unit cell 16 is not constructed with low sensitivity transistor 28 and switch 22c. In these embodiments, a low sensitivity read operation may be performed through high sensitivity transistor 24 and switch 22b. Switches 22a and 22b are closed providing a path through high sensitivity transistor 24 to output bus 30. The accumulated charge stored at capacitor 26 may cause current to be generated at high sensitivity transistor 24 and through output bus 30. This current may represent the amount of accumulated charge at unit cell 16. Post processing unit 14 may then perform calculations to determine pixel information.

FIG. 9 illustrates the configuration of unit cell 16 in a reset operation. Reset may be used to drain accumulated charge from unit cell 16. The drainage of accumulated charge allows unit cell 16 to begin new capture operations for additional images. In a reset operation, switches 22a and 22d are in a closed position. This provides a path to voltage node 32. Voltage node 32 may provide a path for the accumulated charge on unit cell 16 to ground. The path to ground drains the accumulated charge on unit cell 16.

Although the present invention has been described with several embodiments, a myriad of changes, variations, alterations, transformations, and modifications may be suggested to one skilled in the art, and it is intended that the present invention encompass such changes, variations, alterations, transformations, and modifications as fall within the scope of the appended claims.

What is claimed is:

1. A unit cell, comprising:
   a high sensitivity path comprising:
      a first transistor; and
      a first switch, the first switch coupled to an output node and the first transistor;
   a low sensitivity path comprising:
      a capacitor;
      a second transistor; and
      a fourth switch, the fourth switch coupled to the output node and the second transistor; and
   wherein the high sensitivity path is coupled to the low sensitivity path using a second switch, the second switch is operable to isolate the low sensitivity path from the high sensitivity path, and the high sensitivity path and the low sensitivity path are coupled to a voltage node using a third switch.

2. The unit cell of claim 1, wherein the low sensitivity path is operable to store charge received in proportion to a detected light intensity.

3. The unit cell of claim 1, wherein the high sensitivity path is operable to store charge received in proportion to a detected light intensity.

4. The unit cell of claim 1, wherein the second switch is further operable to couple the high sensitivity path to the low sensitivity path when the high sensitivity path becomes saturated.

5. The unit cell of claim 1, wherein the second switch couples the high sensitivity path and the low sensitivity path when accumulated charge received in proportion to a detected light intensity is sufficient to cause the second switch to close.

6. The unit cell of claim 1, wherein:
   the second switch is in a closed position;
   the third switch is in an open position;
   the fourth switch is in a closed position; and
   a signal is read through the output node.

7. The unit cell of claim 1, wherein the low sensitivity path is isolated from the high sensitivity path and the voltage node after a predetermined amount of time has passed.

8. The unit cell of claim 1, wherein:
   the second switch is in the closed position;
   the third switch is in the closed position; and
   charge is drained into the voltage node.

9. The unit cell of claim 1, wherein:
   the second switch is in the open position;
   the first switch is in the closed position; and
   a signal is read though the output node.

10. The unit cell of claim 1, wherein:
    the second switch is in the open position;
    the first switch is in the open position; and
    charge generated in response to a detected light intensity is accumulated at a first node.

11. The unit cell of claim 1, wherein:
    the second switch is in a closed position;
    the third switch is in an open position; and
    charge generated in response to a detected light intensity is accumulated at the capacitor.

12. The unit cell of claim 1, wherein:
    the second switch is in a closed position;
    the third switch is in an open position;
    the first switch is in a closed position; and
    a signal is read though the output node.

13. The unit cell of claim 4, wherein the capacitor begins to store charge in response to the coupling of the high sensitivity path to the low sensitivity path when the high sensitivity path becomes saturated.

14. The unit cell of claim 4, wherein saturation occurs when an accumulated charge at the high sensitivity path exceeds a predetermined threshold.

15. A system for image capture, comprising:
    an image sensor operable to generate an electric charge in proportion to a detected light intensity;
    a unit cell coupled to the image sensor and operable to receive the electric charge, the unit cell comprising:
       a high sensitivity path comprising:
          a first transistor;
          a first switch, the first switch coupled to an output node and the first transistor; and
       a low sensitivity path comprising:
          a capacitor;
          a second transistor; and
          a fourth switch, the fourth switch coupled to the output node and the second transistor;
       wherein the high sensitivity path is coupled to the low sensitivity path using a second switch, the second switch is operable to isolate the low sensitivity path from the high sensitivity path, and the high sensitivity path and the low sensitivity path are coupled to a voltage node using a third switch; and
    a signal processor coupled to the unit cell.

* * * * *